Figure 6:
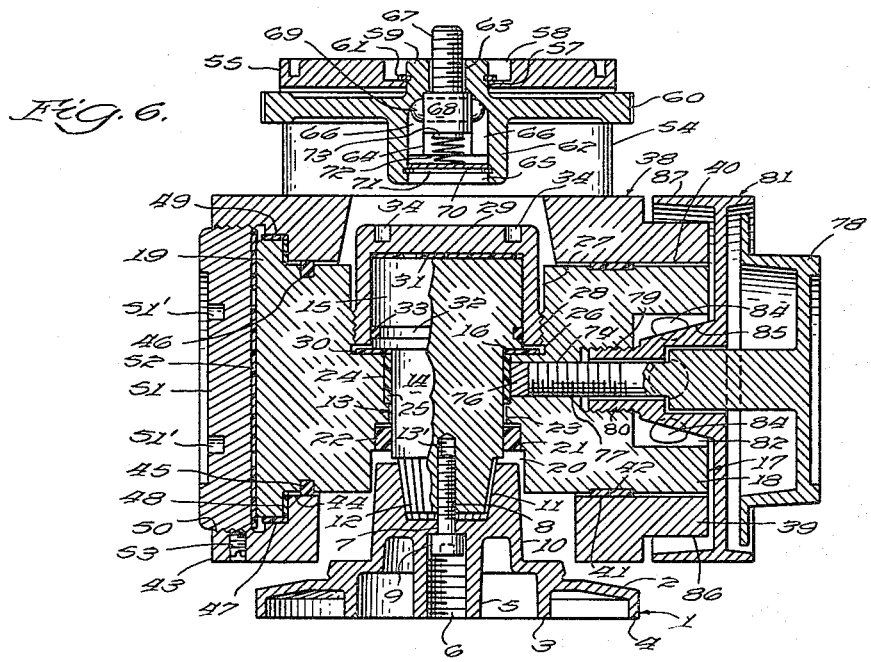

Dec. 29, 1964  H. P. THOMAS  3,163,387
CAMERA HEAD
Filed Aug. 21, 1962  2 Sheets-Sheet 1
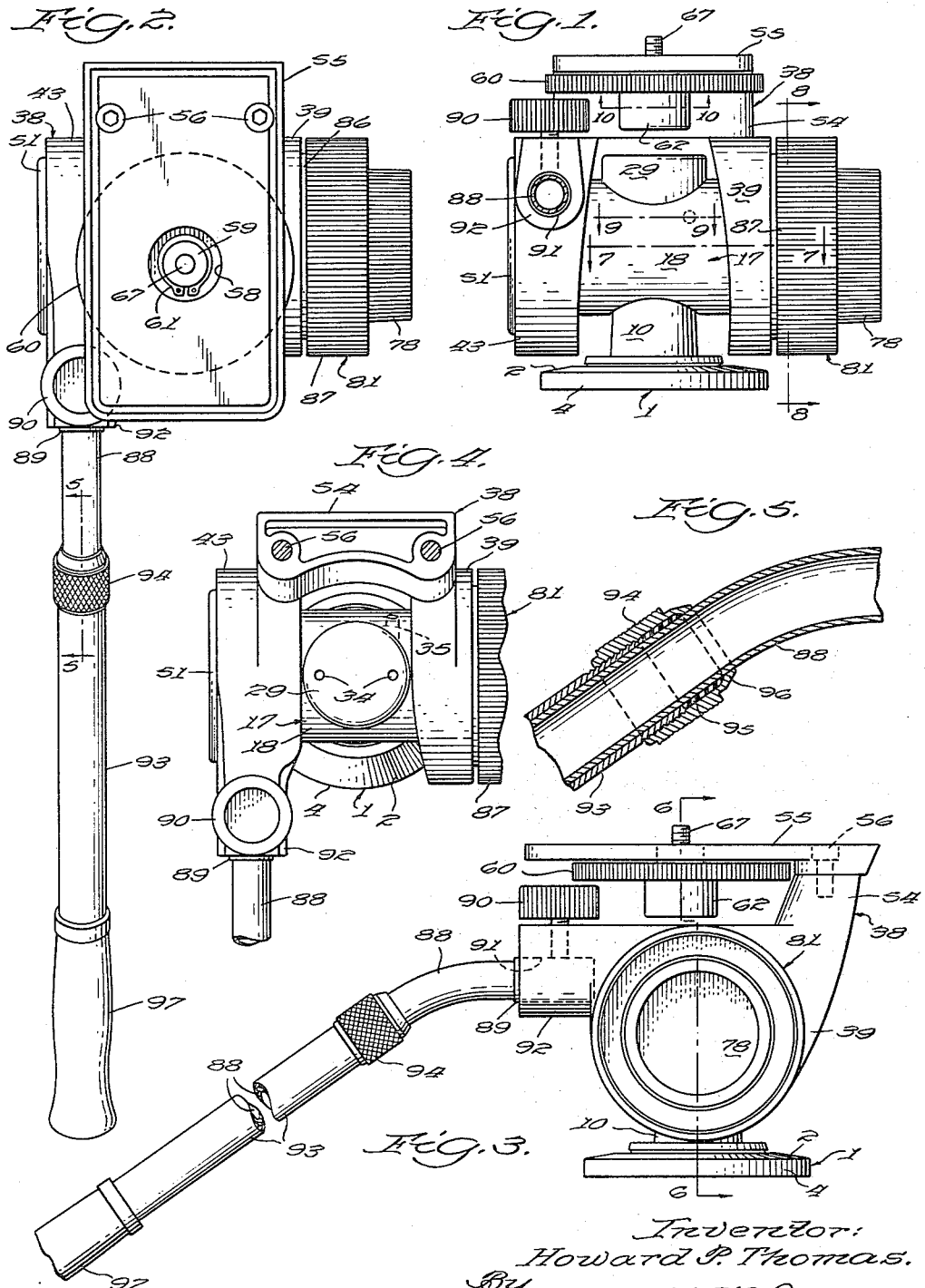
Inventor:
Howard P. Thomas.

Dec. 29, 1964 H. P. THOMAS 3,163,387
CAMERA HEAD
Filed Aug. 21, 1962 2 Sheets-Sheet 2

Inventor:
Howard P. Thomas.
By
Harold J. LeVesconte
Atty.

3,163,387
Patented Dec. 29, 1964

---

3,163,387
CAMERA HEAD
Howard P. Thomas, Hollywood, Calif., assignor to T-A Mfg. Corp., Los Angeles, Calif., a corporation of California
Filed Aug. 21, 1962, Ser. No. 218,295
8 Claims. (Cl. 248—183)

This invention relates to camera tripod heads for motion picture cameras or comparable instruments and more particularly to a form thereof having improved capacity for "panning" movements of the camera as well as the capacity for being quickly locked in any desired position of the camera.

The talking of motion pictures often involves the movement of the camera to cover the scene or follow some movement and such movement involves movement either about a horizontal axis or about a vertical axis or simultaneously about both axes, and such movements are known as "panning."

The primary object of the invention is to provide a camera supporting tripod head characterized by capacity for varying the frictional resistance to movement incident to "panning" operations whereby smooth movement is assured at a resistance factor which is suitable to the desires of the operator.

Another object of the invention is to provide a camera supporting head adapted to be secured to a tripod or like support in which camera movements about a vertical axis and about a horizontal axis are permitted, in which means is provided for locking or releasing the head against movement about each of said axes, in which the means for locking and releasing the head against movement about the vertical axis is separate from the means for locking and releasing the head for movement about a horizontal axis, and in which said locking and releasing means are disposed in coaxial relationship to one another.

Still another object of the invention is to provide a camera supporting head of the foregoing character in which all of the bearings between relatively moving parts are sealed to contain the friction producing compound therein and to exclude dust and other deleterious matter from such bearing surfaces.

A still further object of the invention is to provide a camera supporting head of the above character in which one member of each bearing surface comprises a plastic bushing or thrust washer according to the nature of the bearing engagement whereby metal to metal contact between bearing surfaces is avoided.

Figure 7:
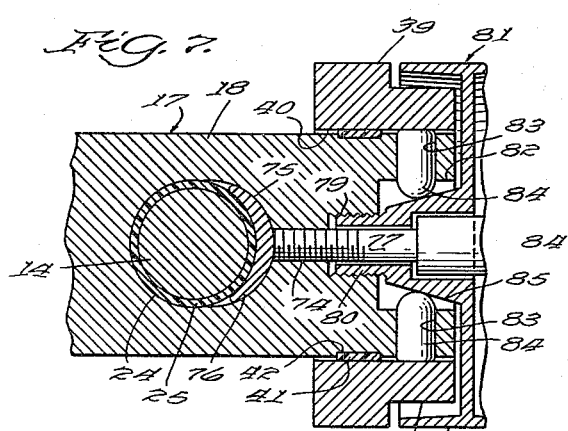
Figure 8:
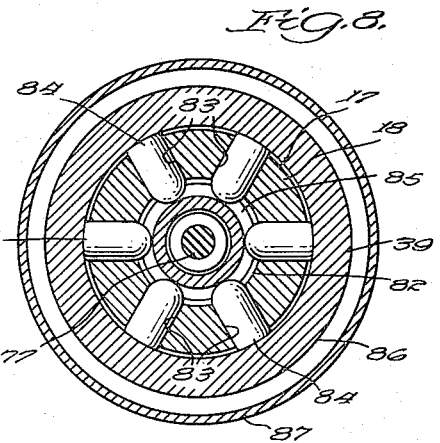
Figures 9, 10:
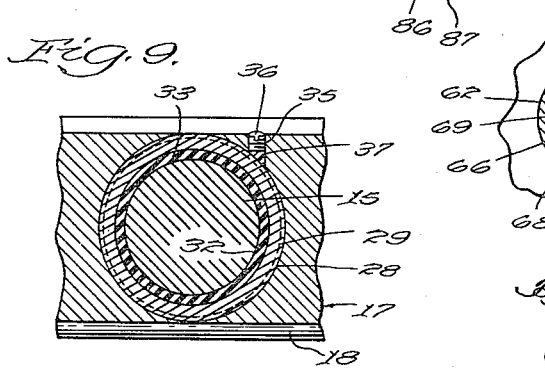

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification, and in which drawings:

FIG. 1 is a rear elevational view of a camera supporting head embodying the present invention; the operating handle being broken away to conserve space, FIG. 2 is a top plan view of the camera supporting head shown in FIG. 1 including the handle, FIG. 3 is a side elevational view as viewed from the right hand side of FIG. 1, a portion of the handle being broken away to conserve space, FIG. 4 is a top plan view of the head with the camera supporting plate component thereof omitted to disclose construction concealed thereby, FIG. 5 is an enlarged fragmentary section taken on the line 5—5 of FIG. 2 showing the interior construction of the clamping means by which the length of the operating handle is varied, FIG. 6 is an enlarged scale, medial sectional view taken on the staggered line 6—6 of FIG. 3, FIG. 7 is an enlarged fragmentary sectional view taken on the line 7—7 of FIG. 1, FIG. 8 is a sectional view on the same scale as FIG. 7 taken on the lines 8—8 of FIGS. 1 and 7, FIG. 9 is an enlarged fragmentary sectional view taken on the line 9—9 of FIG. 1, and FIG. 10 is an enlarged sectional view of the camera mounting screw means taken on the line 10—10 of FIG. 1.

Referring to the drawings, the illustrated embodiment of the invention comprises a base member 1 of circular configuration as viewed in plan and including a relatively wide lower portion 2 having depending inner and outer skirt portions 3 and 4 adapted to engage a supporting surface and further having a centrally disposed depending boss 5 terminating in the same plane as the lower ends of the skirt portions 3 and 4; said boss having an upwardly extending, axially disposed threaded bore 6 terminating in an inwardly extending rib defining a hole 7 through which the body 8 of a mounting screw 9 extends to secure the rest of the head mechanism to the base member 1 as will presently be described in more detail. The threads in the bore 6 are adapted to be engaged by a screw (not shown) which forms a component of a tripod or similar support and which secures the entire head mechanism as a unit on such support; the end of said screw, of course, stopping short of the head of the screw 9 within said threaded bore.

The top surface of the base includes an axially disposed boss 10 having an inverted, frusto-conical socket 11 formed therein in axial alignment with the axial line of the screw 9; said socket receiving the correspondingly tapered, longitudinally serrated tang end 12 of a vertically disposed post 13 having a threaded bore 13' in the lower end thereof engaged by the screw 9 to firmly seat the post 13 in the socket 11; the teeth formed by the serrations on said tang end embedding themselves in the wall of the socket to preclude any possibility of relative turning movement therein. Above the said tang end, the post 13 includes the circular body portion 14 and a somewhat larger circular head portion 15; said body and said head portions being concentrically disposed with respect to the axial line of the post and forming a shoulder 16 at the juncture with each other.

The post 13 provides the axis about which the horizontal panning of a camera mounted on the device is effected and mounted for free rotation on the body portion 14 of the post 13 is the horizontal spindle component 17 about the axis of which the camera is swung for vertical panning. The spindle component 17 is provided with a circular body portion 18 and with a larger, concentrically disposed head 19 at one end of the body portion 18 and is further provided with a transverse bore extending through the body portion with the axial line thereof intersecting the axial line of the body portion 18 said bore comprising in succession, beginning at the end thereof adjacent the base member 1, a first counterbore 20 affording clearance for the upper end of the base member boss 10, a second counterbore 21 in which a plastic bushing 22 is received, the inner face of said bushing engaging the body portion 14 of the post 13 adjacent the tang end thereof, a reduced diameter portion 23 clearing the body 14 of the post 13 slightly, a slightly larger counterbore 24 through which the axial line of the spindle component 17 extends at right angles and in which counterbore a bushing 25 is seated, said bushing engaging the upper end of the body of the post 13 in bearing engagement. The lower end of said bushing rests on the lower end of the counterbore 24 and the upper end of said bushing engages the underside of the head 15 of the post 13 whereby said bushing affords the vertical support for the spindle component 17 and the parts of the device carried by said spindle.

Above the counterbore 24, the portion of the transverse bore in which the head 15 of the post 13 is received includes larger lower and upper counterbores 26 and 27 which are separated by an interposed internally threaded portion 28 of slightly lesser diameter than said counterbores 26 and 27. Threadedly engaging the said threaded portion 28 is the externally threaded lower end of a cap 29 which encloses the top and sides of the post head 15. A plastic washer 30 lies on the shoulder formed by the juncture of the counterbores 24 and 26 and the inner edge of said washer underlies a portion of the post shoulder 16 which overhangs the upper end of the bushing 25. A plastic bearing washer 31 is interposed between the inner end face of the cap 29 and the top end face of the post head 15. The inner diameter of the cap 29 is sufficient to clear the side wall of the post head 15 and a peripheral groove 32 in the lower end of the post head carries an O-ring gasket 33 which forms a seal between the adjacent side walls of the post head and the cap. Since the weight of the spindle and the parts carried thereby is borne by the end surface of the bushing 24, the adjustment of the cap 29 vertically by its threaded engagement with the spindle will vary the clearance between the inner face of the cap and the plastic washer 31. The purpose of such adjustment will be described in detail hereinafter, it being necessary at the moment only to note that the outer end of the cap is provided with sockets 34, 34 for engagement by a suitable wrench element. The space between the cap 29 and the head 15 of the post inwardly of the O-ring gasket 33 is filled with a suitable semi-fluid substance having both a high resistance to shear and a high cohesive affinity for the surfaces of the cap and post head and for the plastic washer and is preferably a substance whose shear and cohesive characteristics change only slightly if at all with temperature changes. For use in environments not subject to a wide range of temperature changes, such as indoors, a substance such as glycerin could be used satisfactorily. Another composition would be a non-drying adhesive such as used on adhesive tape. The drag imposed by this semi-fluid substance enables the portions of the device mounted for rotation on the post 12 to be swung smoothly in either direction. Variation of the pressure imposed by the cap 29 can be achieved by rotating the cap in one direction or the other until the desired "feel" is achieved and a set screw 35 in a threaded hole 36 in a spindle component 18 (see FIG. 9) and bearing on a plastic wedge block 37 engaging the threads on the cap 29 affords means for locking said cap in adjusted position.

Mounted for oscillatory movement on the spindle 17 is a yoke member 38 having a first depending arm 39 provided with a bore 40 which engages the outer surface of a plastic bearing bushing 41 seated in a peripheral groove 42 on the end 18 of said spindle member which is remote from the head 19 thereof and at the opposite side of the vertical post 13 from said head portion. The yoke 38 is further provided with a second depending arm 43 having a bore 44 axially aligned with the bore 30 and the arm 39 and which engages the outer periphery of an O-ring gasket 45 seated in a peripheral groove 46 in the body 18 of the spindle component 17 closely adjacent to the head 19 of said spindle component.

The bore 44 at the side of the arm 43 remote from the arm 39 is provided with a counterbore 47 in the bottom of which a plastic washer 48 engages the end surface of the spindle head portion 19. The peripheral side wall of said counterbore supports a plastic bearing bushing 49 on the inner face of which the periphery of the head 19 of the spindle 17 has journaled. The arm 43 at the outer face thereof is provided with a second and larger counterbore 50 which is internally threaded for reception of the threaded end plug 51 rotatable therein by wrench means engageable with sockets 51′, 51′ in the outer face of said plug and a plastic washer 52 is interposed between the adjacent faces of the end plug 51 and the outer end of the spindle head 19. The cavity surrounding the head 19 enclosed by the end plug 51 and O-ring gasket 45 is filled with a motion retarding, semifluid substance of the same character as employed between the head of the post 13 and the cap 29 and, similarly, adjustment of the end plug 51 toward and away from the head end of the spindle and of the washer 52 will increase or decrease the frictional resistance to oscillation of the yoke 38 on the spindle component 17. A set screw 53 in the arm 43 releasably engages the threads of the end plug 51 to hold it in adjusted position.

The web or connecting member 54 extending between the arms 39 and 43 of the yoke 38 is disposed forwardly of and above the plane of the upper surfaces of the arms 39 and 43 (see FIG. 3) and carries a rearwardly extending camera supporting plate 55 fixed to the upper end thereof by screws 56, 56; said plate being disposed above and spaced from the upper surface of the arms 39 and 43. The plate 55 has a bore 57 extending therethrough the upper surface of said bore terminating in a counterbore 58. Mounted for rotation in the bore 57 is the upper hub 59 of a handwheel 60 having an outer diameter slightly greater than the width of the plate 55; the periphery of said handwheel being knurled, and a snap ring 61 seated in the counterbore 58 and engaging a groove in the hub 59 secures the handwheel in the bore 57 with provision for limited end play. The handwheel 60 also includes a depending axial hub 62 and an axial bore 63 extending through the hub 59 communicates with a counterbore 64 having the inner end thereof disposed at the inner end of the hub 62. At its outer end, the counterbore 64 communicates with a larger counterbore 65 disposed at the outer end of the hub 62. Additionally, the counterbore 64 is provided with a pair of longitudinally co-extensive, diametrically opposite rounded grooves 66, 66. Mounted in the bore 63 is the threaded body 67 of a camera engaging screw which projects above the top surface of the plate 55; the head 68 of said screw being slidable in the counterbore 64 and carrying a crosspin 69, the ends of which loosely engage the grooves 66, 66 to prevent relative rotation between the screw and the handwheel. The lower ends of the counterbore 64 and the grooves 66, 66 are closed by a plate 70 secured against the shoulder formed by the juncture of the counterbores 64 and 65 by a snap ring 71 seated in a groove in the side wall of the counterbore 65 and a compression spring 72 reacting between the upper surface of the plate 70 and the lower end of the screw head 68 constantly yieldingly urges the screw upwardly, the lower end of the screw head preferably having a pilot portion 73 embraced by the spring to keep the spring in alignment. In use, when a camera is to be mounted on the head, the mounting socket of the camera is placed in communication with the end 67 of the screw and the weight of the camera compresses the spring 72 while holding the screw in yieldable engagement with the camera. Turning the handwheel then causes the screw to engage the threads in the socket and clamp the camera in place. This novel construction eliminates the juggling efforts to align the camera with the mounting screw since placing the camera on the plate 55 assures axial alignment.

The end of the spindle 17 remote from the head 19 thereof is provided with a threaded bore 74 disposed in the axial line of the spindle and which bore at its inner end communicates with the transverse groove 75 formed in the side wall of the counterbore 24 in which the bushing 25 is seated; said groove (see FIG. 7) extending for approximately one-third of the circumference of the counterbore 24 and being deeper at its midlength point at which it communicates with the threaded bore 74 than at the ends thereof. Loosely mounted in said groove is a brake shoe element 76 having an inner curved face conforming to the outer diameter of the bushing 24 and said brake shoe at its midlength being engaged by the inner end of a threaded stud 77 engaging the threads of the bore 74. The stud 77 thence extends outwardly beyond the end of the spindle 17 and carries a hand knob 78 by which it can be rotated. When rotated to move inwardly against the brake shoe it causes the brake shoe to distort the bushing 25 and grip the body 14 of the post 13 thus locking the head against rotation about the post 13.

The outer end of the threaded bore 74 communicates with the inner end of a threaded counterbore 79 which is threadedly engaged by the threaded end of a sleeve 80 carried by a second handwheel 81 having an axial opening extending therethrough through which the stud 77 extends without contact therewith. The outer end of the threaded counterbore 79 communicates with a still larger counterbore 82 which extends to the end of the spindle body 18. The wall of the spindle body 18 between the counterbore 82 and the outer surface of said body portion is provided with a plurality of radially extending holes 83 in each of which one each of a plurality of plastic plug elements 84 is loosely mounted. The outer surface of the portion 85 of the sleeve 80 which is disposed within the counterbore 82 is conical and is engaged by the inner ends of the plugs 84, wherefore, rotating the handwheel 81 to cause the sleeve to move toward the end of the spindle 17 will cause the plugs to move outwardly in radial lines and to engage the bore 40 in the yoke arm 39 at a point outwardly of the bushing 42 and thus to lock the yoke against rotative movement on the spindle component 17. To effect compactness in design, the outer end of the arm 39 may be reduced in diameter as at 86 and the skirt portion 87 of the handwheel 81 may then overlie that reduced diameter portion of the yoke arm. It is to be noted that the handwheels or knobs which are rotated to lock or release the head are disposed in side-by-side relation, are also in coaxial relation but are wholly independent in their actions.

For manipulating the head and camera in use, a handle means is provided, said handle means comprising a forward tube 88 having the front end 89 thereof detachably secured by a thumb screw 90 in a socket 91 disposed in a boss 92 formed as an integral part of the yoke arm 43 at the rear face of said yoke arm. The tube 88 between its ends is bent at an obtuse angle and the rear end thereof is slidingly received in the forward end of the rear or handle component tube 93 which is provided with a clamping means comprising a thumb nut 94 threadedly engaging the forward end thereof and overhanging said forward end. Disposed within the portion of said nut which extends beyond the end of the handle component tube 92 is a resilient bushing 95 which is retained between the forward end of the handle component and a peripheral lip 96 at the forward end of the nut; said lip and said bushing both closely fitting the outer diameter of the rear end of the tube 88. When the nut 94 is screwed on to the tube 93 with resultant endwise compression of the bushing 95, the bushing is caused to clamp the tubes together at any desired longitudinal or rotational adjustment thereof. Preferably, the rear end of the handle component tube is provided with a hand grip 97.

Thus there has been provided a camera head which is fluid damped and in which the extent of damping resistance may be adjusted. Additionally, the device is of simple design and is readily locked in any desired position. In this connection, it will be noted that the locking means are arranged to be tightened and released by the right hand of the operator while the head and a camera mounted thereon is being positioned by the left hand grasping the handle means above described. Moreover, it is particularly to be noted that all relatively moving bearing surfaces comprise a metal surface at one side thereof and a plastic material in engagement therewith. While the term "plastic" has been used for the description of these materials it will be understood that generally such acceptable plastic materials for bearing purposes as nylon or Teflon are those which are currently most likely to be employed.

While in the foregoing specification there has been described the presently preferred embodiment of the invention, the invention is not to be deemed to be limited to the precise details of construction thus disclosed by way of example and it will be understood that the invention includes as well all such changes and modifications in the parts, and in the construction, combination and arrangement of parts as shall come within the purview of the appended claims.

I claim:

1. In a head for supporting a camera, a base, a vertical post mounted on said base, and having a bearing surface generated about a vertical axis, a horizontal axis spindle mounted on said bearing surface of said post for free rotation thereon; said spindle having a pair of bearing surfaces generated about a common, horizontal, axial line and disposed one each at each side of said post; a camera supporting yoke means having a portion disposed above said spindle on which a camera may be supported and further having a pair of arms depending from said supporting portion, each of said arms having bearing engagement with one each of said pair of bearing surfaces on said spindle, means disposed in the axial line of said spindle operable to lock said spindle against movement about said post, and other means also disposed in said axial line operable to lock said yoke means against movement about said spindle.

2. A camera supporting head as claimed in claim 1 in which said means for locking said spindle against movement about said post comprises a manually operated screw threadedly engaging said spindle and in which said means for locking said yoke means against movement on said spindle comprises a second manually operated screw also threadedly engaging said spindle and disposed in coaxial relation to said spindle locking means.

3. A camera supporting head as claimed in claim 2 in which a distortable, resilient bushing is interposed between the opposed bearing surfaces of said post and said spindle, and in which means operated by said first-named manually operated screw is effective to distort said bushing and cause it to grip the post sufficiently to prevent rotative movement of said spindle on said post; the resilience of said bushing, upon release from distortion by said screw operated means, serving to release said bushing from said rotation preventing grip on said post.

4. A camera supporting head as claimed in claim 1 in which said means for locking said yoke means against movement on said spindle comprises a manually operated screw element threadedly engaging said spindle and radially expanding means carried by said spindle and actuated by said screw element to move outward radially and grip said yoke means against rotative movement on said spindle.

5. A camera supporting head as claimed in claim 4 in which said manually operated screws are disposed at the end of said spindle opposite said head portion thereof.

6. A camera supporting head as claimed in claim 4 in which said end of said spindle opposite said head is provided with a threaded bore disposed parallel to the axial line of said spindle and communicates with a recess formed as an enlargement of the bore in said spindle affording bearing engagement with said post, in which a resilient bushing is interposed between said post and said post engaging bore in said spindle opposite said threaded bore in said spindle, in which a clamp block is interposed in said recess and is provided with a concave face conforming to and engaging a portion of the outer periphery of said bushing, and in which the threaded end of said first-named manually operated screw engages said block to cause it to distort said bushing with resultant rotation preventing gripping of said post by said bushing.

7. A camera supporting head as claimed in claim 4 in which said end of said spindle opposite said head is provided with a threaded bore in which said first-named manually operated screw is received, in which said spindle is further provided with a threaded counterbore adjacent to said threaded bore and with a larger counterbore disposed outwardly from said threaded counterbore, in which said second manually operated screw is provided with a threaded end engaging said threaded counterbore and with an axial bore through which said first-named manually operated screw extends, and in which a radially expanding brake means extends between a surface of said second-named manually operated screw disposed in said larger counterbore and a surface on said yoke to effect rotation preventing engagement therewith.

8. A camera supporting head as claimed in claim 7 in which said radially expanding brake means comprises an axially disposed, frusto-conical surface on said second-named manually operated screw and is arranged with the smaller end thereof adjacent the threaded end of said screw, a series of radially extending holes in said spindle extending from larger counterbore to the outer surface thereof at a point opposite a surface of the bore in the arm of said yoke having bearing engagement with the end of said spindle opposite the head end of said spindle, and a series of pins freely slidable one each in each of said radially extending holes and engaged within said larger counterbore by said frusto-conical surface; said pins being of such length that screwing said second-named manually operated screw inwardly will cause said frusto-conical portion thereof to move said pins outwardly in said holes and to grip said yoke to prevent rotation thereof on said spindle.

References Cited by the Examiner
UNITED STATES PATENTS

| | | | |
|---|---|---|---|
| 2,272,566 | 2/42 | Laub et al. | 248—186 |
| 2,272,567 | 2/42 | Laub et al. | 248—185 |
| 2,459,040 | 1/49 | Miller | 248—183 |
| 2,717,138 | 9/55 | Sheehan | 248—183 |
| 2,882,001 | 4/59 | Ries et al. | 248—183 |
| 2,905,421 | 9/59 | O'Connor | 248—183 |
| 2,998,953 | 9/61 | O'Connor | 248—183 |
| 3,123,330 | 3/64 | Forbes-Robinson | 248—183 |

CLAUDE A. LE ROY, *Primary Examiner.*